(12) United States Patent
Pflueger et al.

(10) Patent No.: US 10,464,007 B2
(45) Date of Patent: Nov. 5, 2019

(54) FILTER CARTRIDGE FOR A FILTER APPARATUS

(71) Applicant: Mann+Hummel GMBH, Ludwigsburg (DE)

(72) Inventors: Frank Pflueger, Sachsenheim (DE); Fabian Wagner, Moeglingen (DE); Matthias Krohlow, Herrenberg (DE); Daniel Schmid, Sachsenheim (DE); Joerg Menssen, Markgroeningen (DE); Stefan Walz, Freiberg (DE); Christof Mangold, Muenchingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 416 days.

(21) Appl. No.: 15/158,966

(22) Filed: May 19, 2016

(65) Prior Publication Data

US 2016/0263512 A1    Sep. 15, 2016

Related U.S. Application Data

(63) Continuation of application No. PCT/EP2014/074991, filed on Nov. 19, 2014.

(30) Foreign Application Priority Data

Nov. 19, 2013  (DE) ........................ 10 2013 019 289

(51) Int. Cl.
| | |
|---|---|
| *B01D 46/52* | (2006.01) |
| *B01D 46/00* | (2006.01) |
| *B01D 46/10* | (2006.01) |
| *B01D 46/24* | (2006.01) |

(52) U.S. Cl.
CPC ........ *B01D 46/521* (2013.01); *B01D 46/001* (2013.01); *B01D 46/0005* (2013.01); *B01D 46/103* (2013.01); *B01D 46/2411* (2013.01)

(58) Field of Classification Search
CPC ............. B01D 46/0005; B01D 46/521; B01D 46/2411; B01D 46/001; B01D 46/103
See application file for complete search history.

(56) References Cited

U.S. PATENT DOCUMENTS

| | | | |
|---|---|---|---|
| 2,720,279 | A | 10/1955 | James |
| 4,640,698 | A | 2/1987 | Ohishi et al. |
| 5,037,460 | A | 8/1991 | Machado |
| 6,059,851 | A | 5/2000 | Depietro et al. |
| 8,157,883 | B2 | 4/2012 | Felber et al. |

(Continued)

FOREIGN PATENT DOCUMENTS

| | | |
|---|---|---|
| DE | 3502698 A1 | 7/1986 |
| DE | 102011083657 A1 | 3/2013 |

(Continued)

*Primary Examiner* — Robert Clemente
(74) *Attorney, Agent, or Firm* — James Hasselbeck

(57) ABSTRACT

A filter cartridge for a filter apparatus, including: a filter element that encloses an clean space within the filter element, at least partially; wherein the filter element has an outflow opening in flow communication with the clean space in the filter element; wherein the filter element has a longitudinal axis extending through the filter element and through the outflow opening; wherein a hollow base for connecting to a housing-side fastening element is arranged on or in the clean space; wherein an interior of the hollow base is sealed off from the clean space in a flow-tight manner.

19 Claims, 10 Drawing Sheets

(56) References Cited

U.S. PATENT DOCUMENTS

| | | |
|---|---|---|
| 8,551,205 B2 | 10/2013 | Berisha et al. |
| 8,585,794 B2 | 11/2013 | Sudermann |
| 2007/0157589 A1 | 7/2007 | Haberkamp |
| 2011/0083408 A1 | 4/2011 | Raether et al. |
| 2015/0007535 A1 | 1/2015 | Hasenfratz et al. |

FOREIGN PATENT DOCUMENTS

| | | |
|---|---|---|
| DE | 102012012348 A1 | 12/2013 |
| EP | 2676713 A1 | 12/2013 |
| FR | 2063849 A5 | 7/1971 |
| GB | 562103 A | 6/1944 |
| GB | 2159434 A | 12/1985 |
| JP | 4526299 Y1 | 10/1970 |
| WO | 2010111008 A1 | 9/2010 |

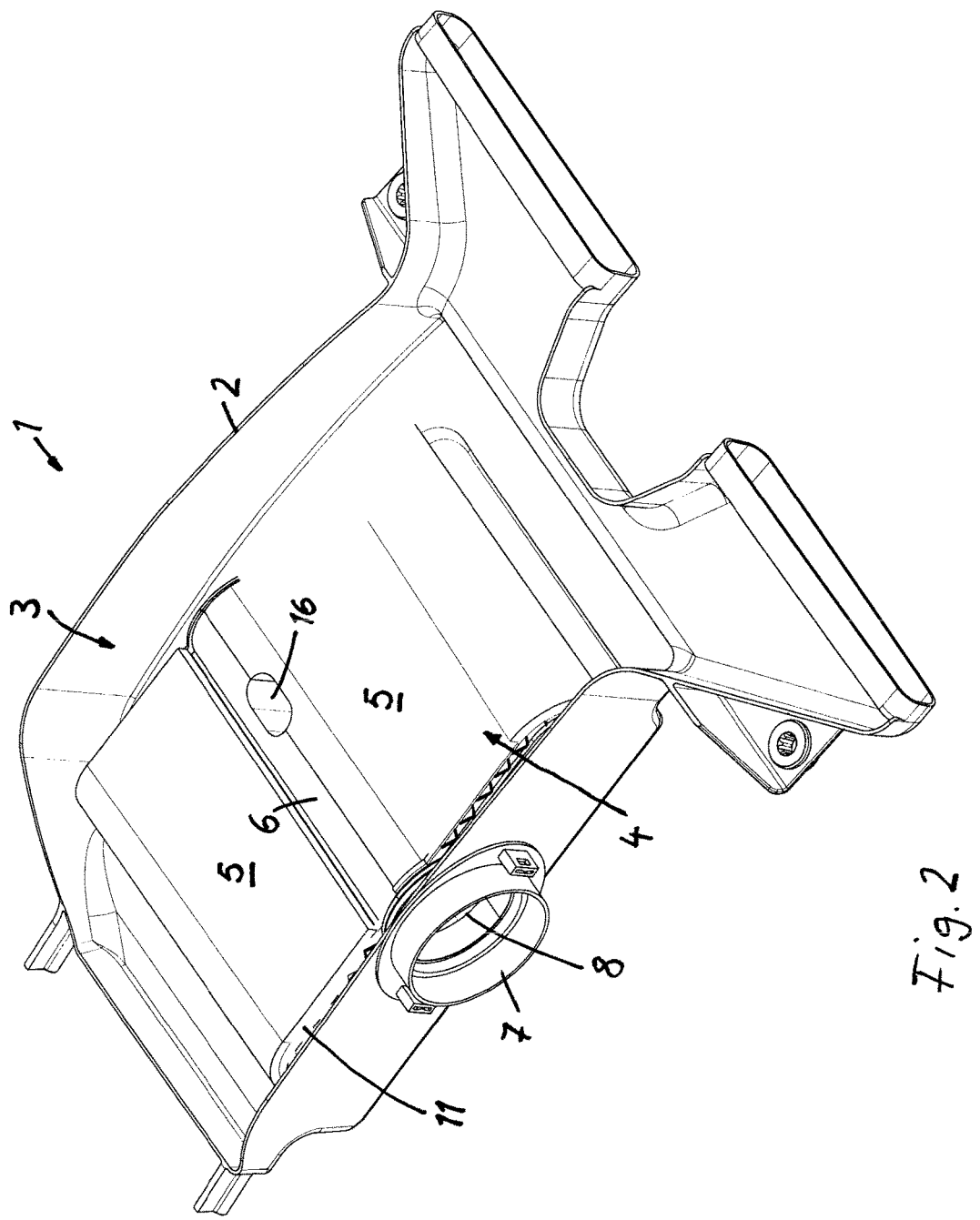

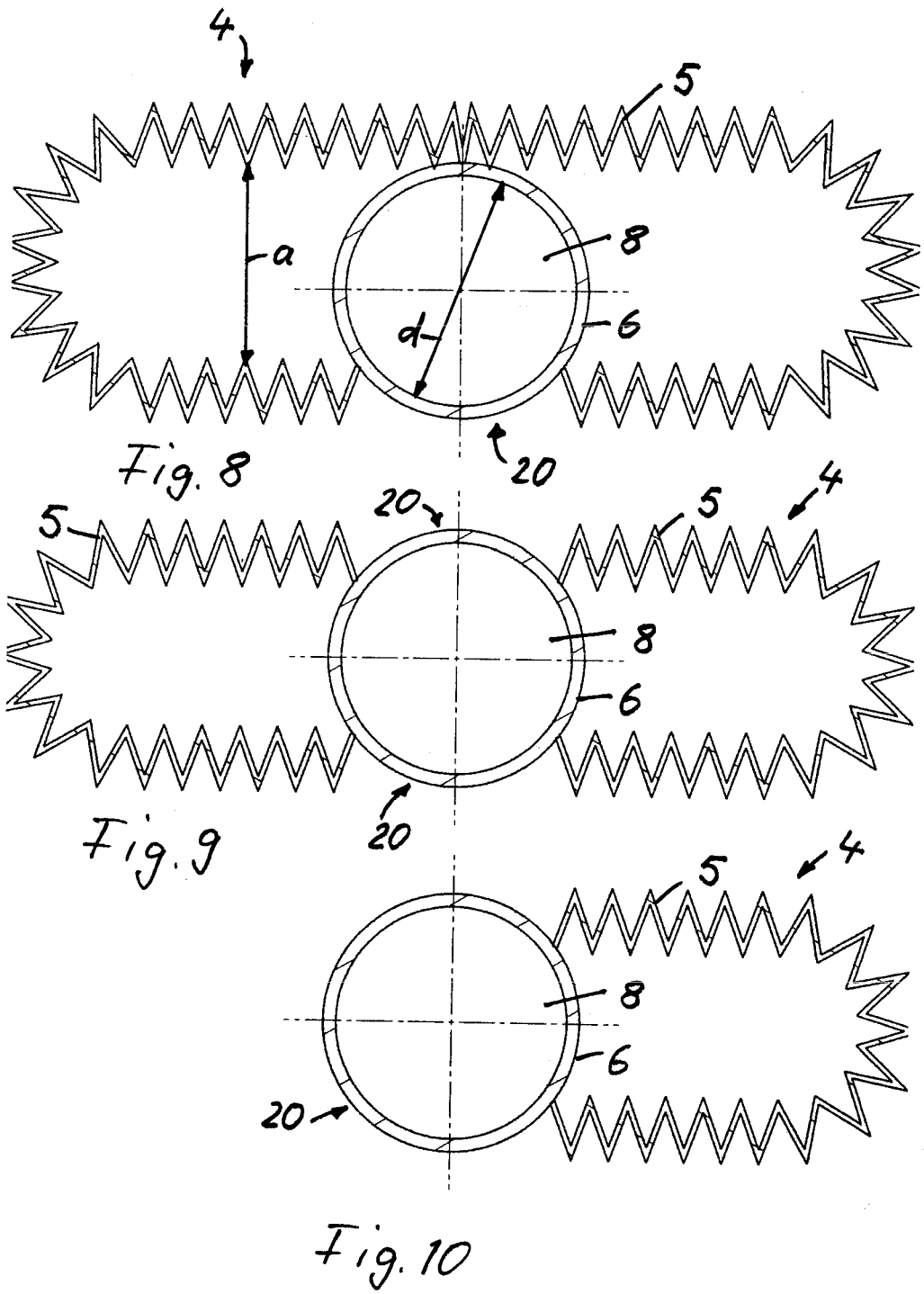

FILTER CARTRIDGE FOR A FILTER APPARATUS

TECHNICAL FIELD

The invention relates to a filter cartridge for a filter apparatus, particularly a gas filter.

BACKGROUND OF THE INVENTION

In EP 2 152 385 B1, a gas filter with a filter cartridge is described which can be inserted into a filter housing and has a U-shaped filter element through which the fluid to be filtered flows radially from the outside to the inside. Disposed between the two legs of the U-shaped filter element is the clean space from which the filtered fluid is discharged via an outflow opening, said outflow opening being integrated into a cover panel on the free front sides of the legs.

Moreover, cylindrical filter elements are known which are flowed through radially from the outside to the inside and enclose an axial outflow space from which the fluid is discharged axially. Such cylindrical filter elements are sealed on the front sides by end plates, an outflow opening being disposed in an end plate through which the fluid is discharged axially into a secondary channel.

What is generally sought after in filter apparatuses is high cleaning performance with geometric dimensions that are as small as possible.

SUMMARY OF THE INVENTION

It is the object of the invention to provide, using simple measures, a filter cartridge for a filter apparatus that can be fastened in a simple and secure manner in a filter housing.

The invention relates to a filter cartridge for a filter apparatus for filtering a fluid, particularly for gas filters, such as air filters for combustion engines, for example, with which the combustion air to be fed to the cylinders of the combustion engine is subjected to filtration. In principle, however, use for liquid filtration is also possible, for example for filtering oil or fuel in motor vehicles.

The filter apparatus includes a filter housing with a receiving space disposed therein and a filter cartridge that can be inserted into the receiving space in the filter housing. The filter cartridge has a filter element made of a filter medium or filtering means, for example a filter paper, as well as an outflow opening on the front side of the filter element, through which the cleaned fluid is discharged from the filter element after flowing through the filtering means. The outflow opening lies on the filtered side of the filter element and communicates in the installed position with corresponding openings or pipes or channels to discharge the cleaned fluid.

The filter element of the filter cartridge encloses a clean space at least partially that borders on the filtered side of the filter element. Moreover, a hollow base is arranged in the filter cartridge that is used for connecting to at least one housing-side fastening element and is arranged in or on the clean space. The interior of the hollow base is sealed off in a flow-tight manner from the clean space.

This embodiment enables the filter cartridge to be fixed in a simple manner in the filter housing: a fastening element, such as a fastening dome, for example, that is connected to the filter housing or housing cover, projects into the interior of the hollow base, thus fixing the filter cartridge in the receiving space of the filter housing. The interior of the hollow base can be continuous; optionally, however, embodiments can be considered in which the interior of the hollow base is discontinuous. Moreover, it is possible for a respective fastening element to project via different sides into the interior of the hollow base both from the bottom of the receiving space in the filter housing and from the housing cover. Finally, it can also be expedient to introduce a screw or the like into the interior of the hollow base as a fastening element and to connect the screw to another fastening element, for example a dome, that projects from the opposing side into the hollow base.

As a result of the flow-tight design of the hollow base, the interior space is separated from the clean space, so that no leakage flows from the clean space into the interior space of the hollow base can occur.

According to one advantageous embodiment, the hollow base, regardless of whether the hollow base interior space is continuous or interrupted, extends over the height of the filter element. It can be expedient for the hollow base to be connected to the filter element, thus imparting additional stability to the filter element. Designs that are worthy of consideration include both those in which the hollow base lies within the clean space and designs in which the hollow base borders the clean space.

The hollow base is expediently embodied as a plastic component that is at least approximately hollow cylindrical, but preferably with an elongate cross section. The elongate cross-sectional shape of the hollow base makes it possible, even with a housing-side fastening element that projects into the interior of the hollow base, to displace the filter cartridge slightly in the direction of the longitudinal extension of the cross section, thus establishing contact between the outflow opening at the clean space and a nozzle in the housing, for example.

An outflow pipe can be provided in the filter cartridge that is connected to the clean space and through which the cleaned fluid is discharged. The hollow base can be integrated into the outflow pipe and project through same. In this case as well, the interior space of the hollow base is separated from the hollow base outer wall in a flow-tight manner, thus preventing undesired leakage flows.

According to another expedient embodiment, the hollow base extends orthogonally between an upper and a lower layer of the filter element that border on the clean space. The clean laterally separates major portions of the upper and lower layers from one another. For example, the filter element has a U-shaped or a V-shaped cross section, the two legs of the U-shaped cross section each forming the upper and lower filter layer, respectively, that border the clean space. The outflow opening expediently does not rest against the free front sides of the legs, but rather against the longitudinal sides of the legs, whereby the fluid flows out of the clean space transverse to the longitudinal extension of the legs. The exterior distance from leg to leg defines the height of the filter element that is adapted to the height of the receiving space in the filter housing.

According to another expedient embodiment, the hollow base extends transverse to the longitudinal axis of the outflow opening, through which the cleaned fluid is discharged from the clean space. Insofar as an outflow pipe is provided in the filter cartridge and the outflow opening forms the front side of the outflow pipe, the hollow base extends transverse to the longitudinal axis of the outflow pipe. Preferably, the longitudinal axis of the outflow opening lies transverse to the direction of flow of the filter element, so that, in the case of a filter element with a U-shaped basic cross section, for example, the fluid to be cleaned flows through the filter element radially from the outside to the inside, and the fluid is discharged from the clean space axially in the direction of the longitudinal axis of outflow pipe or outflow opening.

The filter element of the filter cartridge advantageously has at least one flattened portion in relation to the longitudinal axis of the outflow opening that has a reduced radial thickness and extends immediately adjacent to the outflow opening along the periphery of the outflow opening. The filter element thus has a reduced thickness along a defined angular segment along the outflow opening. Optionally, the thickness can be reduced to zero, so that a through hole is present in the filter element that also extends over a defined angular segment along the periphery of the outflow opening.

This embodiment has the advantage that, in relation to the outer dimensions of the filter element, a relatively large outflow opening for discharging the filtered fluid is present, which is associated with reduced flow resistance on the filtered side of the filter element. The reduced flow resistance downstream from the filter element increases the cleaning efficiency, so that predefined requirements for a certain level of cleaning performance can be met even with smaller-sized filter elements.

According to another advantageous embodiment, a housing nozzle which, when installed, communicates with the filtered side of the filter element and serves to discharge the cleaned fluid, is arranged at the receiving space of the filter housing used to receive the filter cartridge. The diameter of the housing nozzle is at least 50%, preferably at least 75% of the height of the receiving space into which the filter cartridge is inserted. The housing nozzle and the outflow opening of the inserted filter cartridge communicate with one another, particularly in such a way that the outflow opening and the housing nozzle are arranged coaxially to one another when installed. The outflow opening rests particularly directly against the housing nozzle of the filter housing.

In this case as well, the flow resistance of the filter cartridge and of the filter element is reduced as a result of the relatively large diameter of the housing nozzle. Another advantage of this embodiment is that relatively flat filter apparatuses can be used without restricting the cleaning performance, for example filter housings in which the height of the receiving space is no more than half the width and/or length of the receiving space. The diameter of the housing nozzle can optionally reach the entire height or at least approximately the entire height of the receiving space. The diameter of the housing nozzle refers here to the clear inside diameter. Due to the thin-walled design of the housing nozzle, which is usually made of a plastic material, the outside diameter can also be used for assessing the geometries.

The outside diameter of the outflow opening can optionally be less than the height of the filter element. In this case, the filter element does not enclose the outer periphery of the outflow opening; rather, a through hole exists, so that an angular segment over the outer periphery of the outflow opening is free of filtering means of the filter element.

It can be expedient to equip the filter cartridge with an outflow pipe against which the filter element rests and around which the filter element engages at least partially. The outflow pipe, which is located on the filtered side of the filter element, has at least one flow opening disposed in the wall through which the fluid on the filtered side of the filter element can flow into the outflow pipe and be discharged axially along the outflow pipe. The outflow opening is located on the front side of the outflow pipe, two designs that are worthy of consideration are those in which the outflow opening is embodied in a component separate from the outflow pipe, for example an outflow ring which, however, is placed onto or inserted into the outflow pipe, or also those in which the outflow opening forms the front-side opening of the outflow pipe. Expediently, the outflow pipe has at least approximately the same length as the filter element, whereby it is possible for the cleaned fluid to pass uniformly over the length of the filter element into the outflow pipe.

According to another expedient embodiment, a plug-in part is plugged into the outflow pipe that has a shorter length than the outflow pipe and influences the acoustic characteristics, optionally also the flow behavior, of the filter apparatus. The plug-in part is expediently plugged from outside into the outflow pipe via the outflow opening. The plug-in part can have a tulip-shaped extension on a front side, preferable on the front side projecting into the outflow pipe, in order to influence the acoustic and/or the flow characteristics in a desirable manner. A constriction is located in the plug-in part immediately before the tulip-shaped widening that brings about a nozzle effect with the subsequent widening.

Different design variants of the filter element are possible with respect to the outflow opening. For example, the filter element can engage around the outflow opening over an angular segment of at least 180°, e.g., over an angular segment of 270°, optionally also greater than 300°, but less than 360°, so that an angular segment on the outer perimeter of the outflow opening is free of filtering means. However, embodiments are also possible in which the outflow opening is completely enclosed by filtering means of the filter element, in which case the filter element has a flattened portion over at least one angular segment and is thus provided with a smaller radial thickness in order to enable large diameters of the outflow opening in relation to the height of the filter element.

According to another embodiment, the filter element engages around the outflow opening over an angular range of no more than 180°, particularly no more than 90°, which opens up the possibility of having several mutually independent filter elements border the outflow opening, in which case a common outflow opening is used by the different filter elements to discharge the cleaned fluid. For instance, in the case of a U-shaped basic cross section of the filter element, a filter cartridge with two diagonally opposing filter elements can be arranged at the outflow opening and, optionally, a central outflow pipe. Each filter element borders on the outflow opening or the outflow pipe via an angular segment of less than 180°, whereby, in the case of a diagonally opposing arrangement of the filter elements, a respective angular segment on the periphery of the outflow opening or outflow pipe remains free of filtering means. According to another expedient embodiment, the opposing filter elements are interconnected via a flattened connecting section that rests directly against the outer periphery of the outflow opening or outflow pipe but whose thickness is reduced.

According to another expedient embodiment that relates to a filter element that encloses a clean space at least partially, the interior spacing of the filtering means of the filter element is shorter than the inside diameter of the outflow opening. In this regard, designs that are worthy of consideration include those in which the inside of the filtering means rests against the outer periphery of the outflow opening or an extension of the inner side is located outside of the inside diameter of the outflow opening, as well as those in which the extension of the inside cuts the clear inside diameter of the outflow opening.

According to another expedient embodiment, the filter element is embodied as a folded filter with filter medium folded in a zigzag pattern. The folded filter can assume different basic geometries; for example, it can have a U-shaped cross section as described above.

The filter cartridge, which can be inserted into the receiving space in the filter housing, has at least one filter element and one outflow opening, which is embodied as an outflow ring, for example. Optionally, filter cartridges with at least two filter elements on a common outflow opening can also be considered. Moreover, it is possible to insert only one filter cartridge or, optionally, even several filter cartridges into the receiving space in the filter housing, for example two mutually adjacent filter cartridges, an outflow opening being associated with each filter cartridge and communicating respectively with a housing nozzle on the filter housing.

According to another advantageous embodiment, the filter element is provided on its filtered side with a secondary outflow opening that is arranged at a distance to the first outflow opening. The secondary outflow opening enables the use of the cleaned fluid in an additional unit. In the case of a U-shaped embodiment of the filter element, the secondary outflow opening, with which a secondary nozzle in the filter housing is expediently associated, can be arranged both on the same side as the primary outflow opening and on the opposite side. The outflow direction through the primary outflow opening and the secondary outflow opening expediently occurs in parallel. If two or more filter elements are associated with a filter cartridge, the embodiments that merit consideration are both those in which only one filter element is provided with a secondary outflow opening and those in which several or all filter elements are each equipped with at least one outflow opening.

BRIEF DESCRIPTION OF THE DRAWINGS

Additional advantages and expedient embodiments can be derived from the other claims, the description of the figures and the drawings.

FIG. 2 shows the filter apparatus according to FIG. 1 from another perspective, FIG. 8 shows a sectional, schematic representation of a filter cartridge with a filter element embodied as a folded filter that engages partially around an outflow opening, FIG. 9 shows another exemplary embodiment with two separate filter elements, each of which borders on the outflow opening, FIG. 10 shows another exemplary embodiment with a single filter element at the outflow opening.

In the figures, similar components are designated by the same reference symbols.

DETAILED DESCRIPTION

Figure 1:
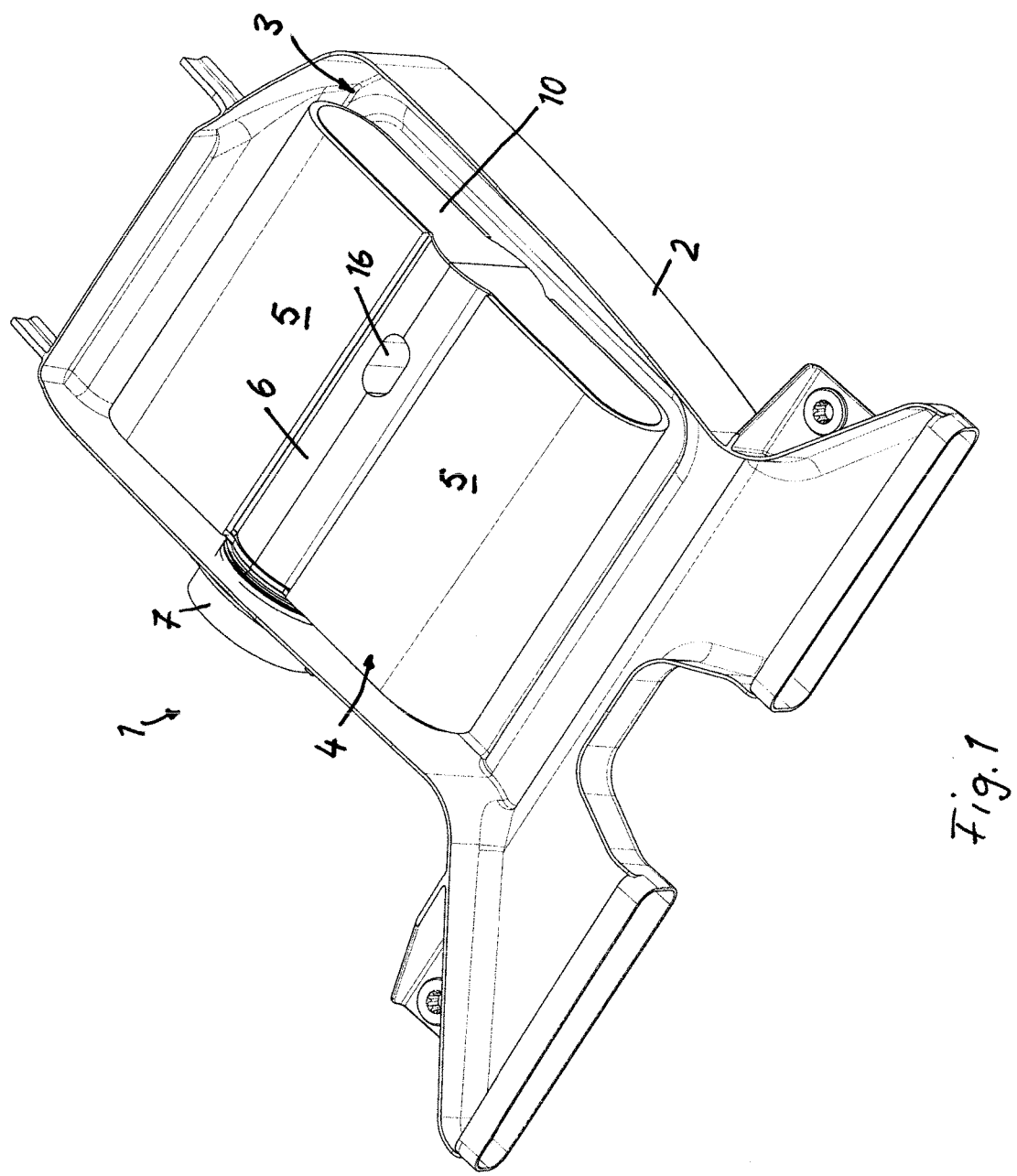
FIG. 1 shows a perspective view of a filter apparatus with a filter cartridge in a receiving space of a filter housing, the filter cartridge having two diagonally opposing filter elements with a U-shaped cross section arranged on an outflow pipe, and the outflow pipe being connected to a housing nozzle on the filter housing.
Figure 4:
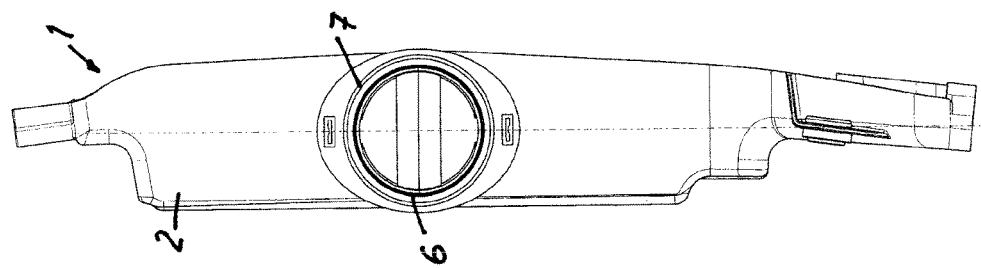
FIG. 4 shows a side view of the filter apparatus with a representation of the housing nozzle for discharging the cleaned fluid.

FIGS. 1 and 2 show a perspective view of a filter apparatus 1, which is embodied as an air filter for a combustion engine and has, in a receiving space 3 in a filter housing 2, a filter cartridge 4 for filtering the conveyed combustion air. The filter cartridge forms a structural unit and includes two filter elements 5 and an outflow pipe 6. The two filter elements 5 are arranged on diagonally opposing sides of the outflow pipe 6 and each have an approximately U-shaped cross section. Optionally, V-shaped cross sections of the filter elements can also be considered. The filter elements 5 are each flowed through radially from the outside to the inside—in the direction of the outflow pipe 6—by the fluid to be filtered. Flow openings are disposed in the wall of the outflow pipe 6 that are connected to the filtered side of the filter elements 5, whereby the fluid travels after filtration via the flow openings into the outflow pipe 6 and is discharged axially via the outflow pipe 6.

One or more flow-conducting apparatuses can be arranged in the outflow pipe 6 and/or in the filter elements 5 to guide the fluid.

A housing nozzle 7 is arranged on the outer wall of the filter housing 2 that includes a recess in the housing wall and to which the outflow pipe 6 is connected. The front-side opening of the outflow pipe 6 forms the outflow opening 8, which rests directly against the housing nozzle 7. A channel or pipe can be connected on the side of the housing nozzle 7 opposite the outflow pipe to discharge the cleaned fluid. In the embodiment as an air filter, the outflow pipe 6 can, as a component of the filter cartridge 4 and of the housing nozzle, form a part of the suction conduit through which the cylinders of the combustion engine are supplied with fresh air.

Figure 3:
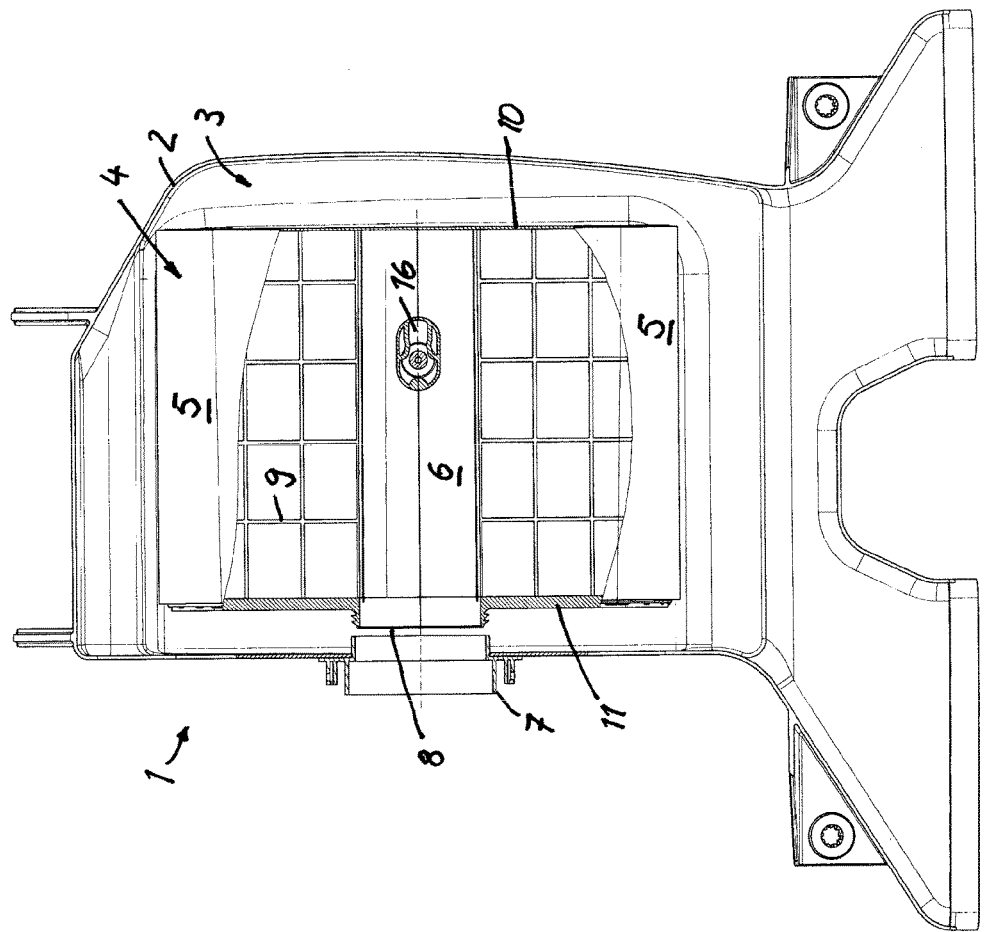
FIG. 3 shows a partially sectional top view of the filter apparatus.

As can be seen particularly from FIG. 3, the filter element 5 has a supporting frame 9 that supports the filtering means or medium through which the fluid to be filtered flows. The filter element 5 has an approximate U-shape, the free front sides of the legs of the U-shape resting against the lateral surface of the outflow pipe 6. Accordingly, the rounded U-shape lies on the side facing away from the outflow pipe 6.

The legs of each U-shaped filter element 5 engage around an intermediate clean space, which communicates via the flow openings in the wall of the outflow pipe 6 with the interior of the outflow pipe. On the front side, the filter elements 5 and thus the interposed clean space is sealed by end plates 10 and 11. On the side opposite the outflow opening 8, the end plate 10 additionally seals the rear opening of the outflow pipe 6 as well.

The diameter of the outflow pipe 6 and of the outflow opening 8, which corresponds to the clear diameter of the outflow pipe on its outflow side, is approximately the same size as the height of the filter element 5. The filter elements 5 do not enclose the outflow pipe 6 completely, but rather leave two angular segments along the periphery of the outflow pipe 6 free. The free front sides of the U-shaped filter elements 5 rest against the outer wall of the outflow pipe 6, an angular segment of less than 180°, for example approximately 90°, on the outer periphery of the outflow pipe 6 being covered by each filter element 5.

The height of the filter cartridge 4 is significantly shorter than the width or length of the filter cartridge. The height is particularly no more than half as large as the width and/or the length of the filter cartridge. The same applies to the dimensions of the receiving space 3 in the filter housing 2 for receiving the filter cartridge 4.

Figure 5:
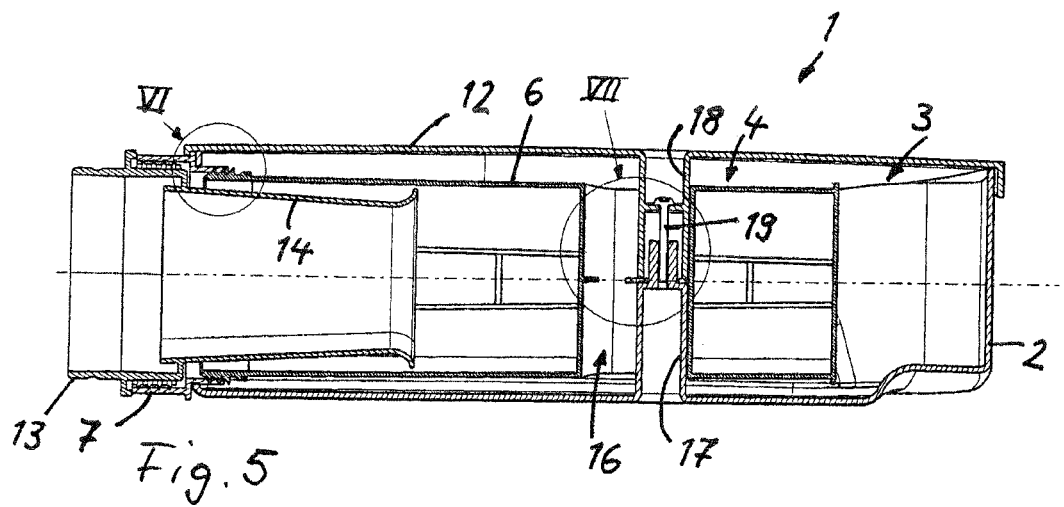
FIG. 5 shows a section through the filter apparatus.
Figure 6:
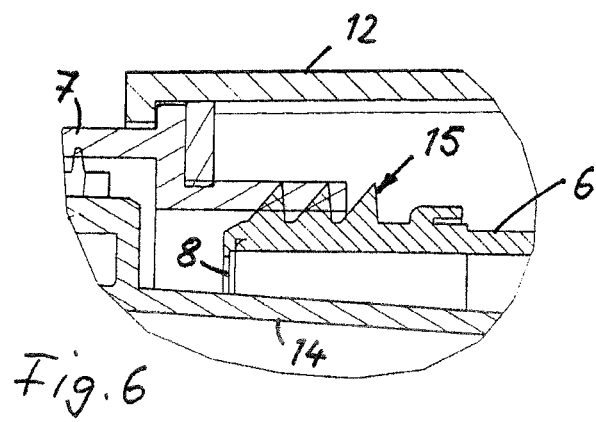
FIG. 6 shows an enlarged representation of detail VI from FIG. 5.
Figure 7:
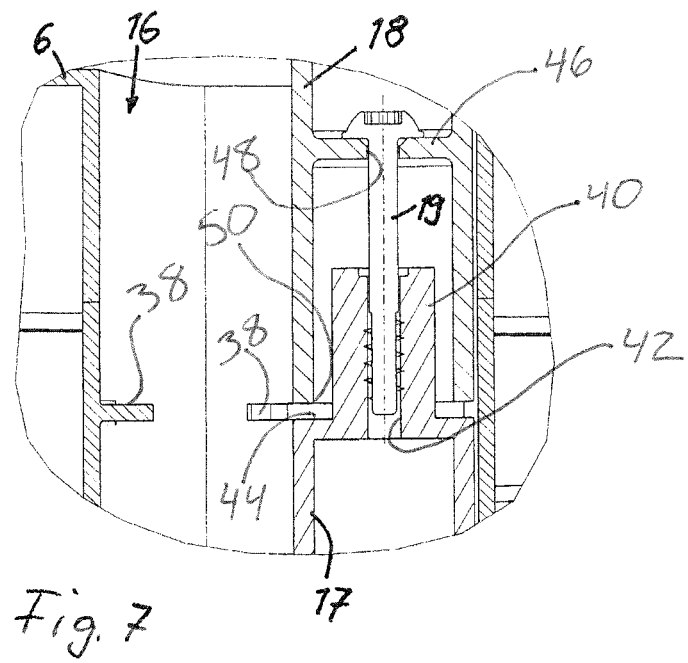
FIG. 7 shows an enlarged representation of detail VII from FIG. 5.

As can be seen in the sectional representation according to FIG. 5 and from the detailed illustrations according to FIGS. 6 and 7, the receiving space 3 in the filter housing 2 is to be sealed by a detachable housing cover 12. A conduit 13 is connected to the housing nozzle 7, which is plugged into a recess in the filter housing 2, through which the cleaned fluid is discharged. Via the outflow opening 8 that forms the front side of the outflow pipe 6, a plug-in part 14 is plugged into the outflow pipe 6 whose length is less than the length of the outflow pipe 6. The conduit 13 is embodied as a nozzle that is integrally formed with the plug-in part 14, the nozzle 14 projecting only slightly beyond the outflow opening 8 of the outflow pipe 6 and having an overall smaller diameter than the conduit 13. The plug-in part 14 has a diameter that changes over its axial length, initially decreasing continuously starting from the front-side region lying immediately outside of the outflow opening and widening in the manner of a tulip on the opposing front side that projects into the outflow pipe 6. By means of the plug-in part 14, the noise characteristics and possibly the flow characteristics as well can be influenced.

As can be seen in the enlarged illustration according to FIG. 6, a knurl or groove portion 15 can be arranged on the front-side end region of the outflow pipe 6 on the outside with which the outflow pipe 6 is inserted into the larger-sized housing nozzle 7, whereby a sufficiently robust and flow-tight connection is achieved between the outflow side of the outflow pipe 6 and the housing nozzle 7. A corresponding knurl or groove portion can also be arranged on the outer lateral surface of the nozzle-like conduit 13 that is integrally formed with the plug-in part 14, the knurl or groove portion being engaged around by another portion of the housing nozzle 7. This knurl or groove portion can optionally also be embodied as a separate component that is arranged between the outer lateral surface of the nozzle-like conduit 13 and the interior of the housing nozzle 7.

A hollow base 16 is introduced into the outflow pipe 6 through which the outflow pipe 6 passes completely in the radial direction. The hollow base has an elongate, substantially oval-shaped cross section and is used to secure the filter cartridge 4 in the filter housing 2. The hollow base 16 has a circumferential wall that separates the interior of the hollow base from the interior of the outflow pipe 6 in a flow-tight manner. The interior of the hollow base 16 serves to receive the housing-side fastening elements 17, 18 (FIGS. 5, 7), which are integrally formed with the filter housing 2 and the housing cover 12 and extend orthogonally to the longitudinal axis of the outflow pipe 6 and project into the interior of the hollow base 16. The fastening elements 17, 18 each form a dome that has a smaller cross section than the inside of the hollow base 16, thus enabling a relative axial displacement of the outflow pipe 6 and filter cartridge 4 along the longitudinal axis of the outflow pipe. The dome-like fastening elements 17, 18 are interconnected via a screw 19 that is inserted via the housing cover 12. An interior wall of the hollow base 16 has internally projecting integral partial flange fingers 38. The dome-like fastening elements 17 and 18 provide a thread receiver 40 having a fastener thread receiving bore 42 and a shoulder 44. Fastener element 18 has a fastener head support 46 penetrated by a fastener shank bore 48. Fastener element 18 also has contacting ends that capture the flange finger 38 between the contracting ends 50 and the shoulder 44 of the fastener element 18. Torquing fastener 19 not only secures the housing cover 12 to the housing 2 but also secures filter cartridges 4 via the outflow pipe 6 to the housing 2.

For assembly, the filter cartridge 4 is first placed into the receiving space 3 of the filter housing 2, the dome-like fastening element 17, which is integrally formed with the filter housing 2 and rises from the bottom of the receiving space, projecting into the interior of the hollow base 16 in the outflow pipe 6. The outflow pipe 6 is then displaced along its longitudinal axis such that the front-side portion of the outflow pipe 6 is pushed with the knurl 15 or groove portion into the housing nozzle 7, which is arranged on the filter housing 2. After that, the plug-in part 13, 14 can be inserted axially via the outflow opening 8 into the outflow pipe 6. Finally, the housing cover 12 is put in place and the dome-like, downwardly projecting fastening element 18 on the housing cover 12 is inserted into the interior of the hollow base 16 in the outflow pipe 6 until the dome-like fastening elements 17, 18 are arranged coaxially to one another and can be securely interconnected by means of the screw 19.

FIGS. 8 to 10 show schematic representations of various exemplary embodiments for filter cartridges 4 with filter elements 5 and an outflow opening 8. The outflow opening is located on the front side of the outflow pipe 6, whose inside diameter d, as can be seen in FIG. 8, is larger than the interior distance a between the inner-lying tips of the filter element 5 embodied as a folded filter. The filter element 5 is U-shaped, so that the tips inside of them enclose a clean space whose clear height corresponds to the interior distance a. Insofar as the outflow pipe 6 does not have a round but an oval-shaped cross section, the relationships refer to the radial inner extension of the outflow pipe with respect to the height in the direction of the interior distance a of the filter element 5.

According to one advantageous embodiment, the radial extension d of the outflow pipe 6 is approximately equal to or shorter than the housing height with respect to the vertical direction or the direction of the interior distance a of the filter element 5.

The filter element 5 has two U-shaped portions that are interconnected on one side of the outflow pipe 6, whereas a through hole 20 is disposed on the opposite side on the circumferential side of the outflow pipe 6. The through hole 20 extends in the circumferential direction of the outflow pipe 6 over an angular segment of approximately 90°. The free ends of the filter element 5 rest against opposing sides of the through hole on the lateral surface of the outflow pipe 6. In the continuous portion, which is at the top in FIG. 8, the inner-lying tips of the filter element 5 contact the lateral surface of the outflow pipe 6, whereas, as a result of the shorter interior distance a, the tips lying inside of them project farther inward on the opposite side of the filter element.

In the exemplary embodiment according to FIG. 9, the filter cartridge 4 has two individual, mutually separate filter elements 5, each of which has a U-shaped basic cross section and is embodied as a folded filter. The free front sides of the legs of the U-shaped filter elements rest against the lateral surface of the outflow pipe 6 and engage around a respective angular segment that covers about 90°. The two filter elements 5 are arranged diagonally across from one another, whereby, on the periphery of the outflow pipe 6 between the two filter elements 5, a through hole 20 is formed above and below that also extends respectively over an angular segment of about 90°. The parallel legs in the U-shaped basic cross section can also be aligned at a certain angle in relation to one another, thus resulting in a V-shaped arrangement or a combined U-and V-shaped arrangement.

In the exemplary embodiment according to FIG. 10, the filter cartridge 4 includes only one single U-shaped filter element 5, which is embodied as a folded filter and whose free front sides rest against the outer periphery of the outflow pipe 6. The filter element 5 engages around an about 90° angular segment on the periphery of the outflow pipe 6. Accordingly, the through hole 20 covers an angular segment of about 270°.

Figure 11:
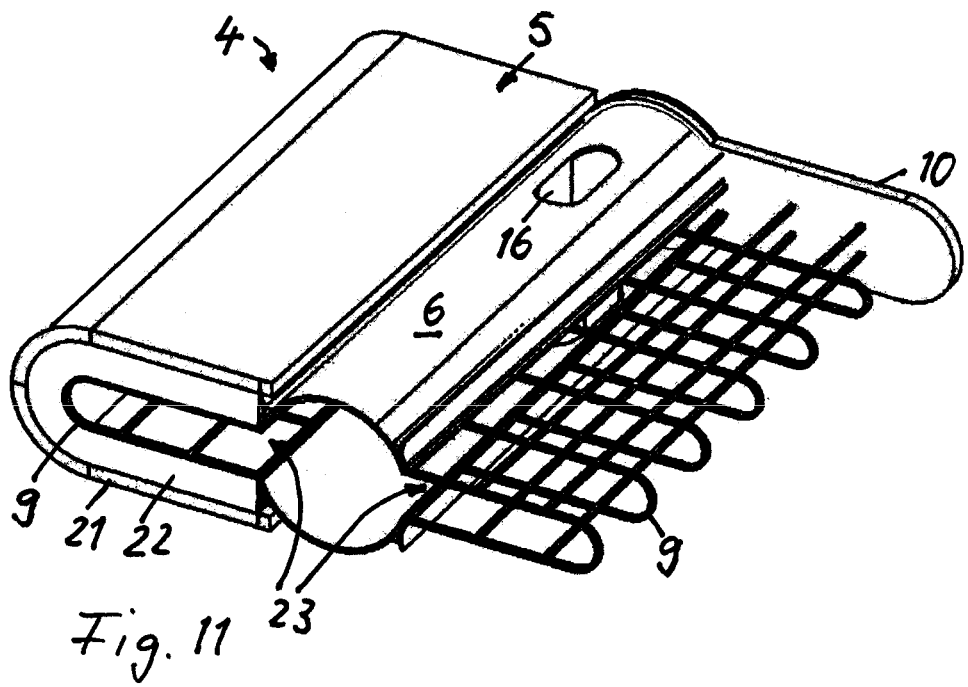
FIG. 11 shows a perspective view of a filter cartridge whose basic structure corresponds to that of FIG. 9, in a partially installed state.
Figure 12:
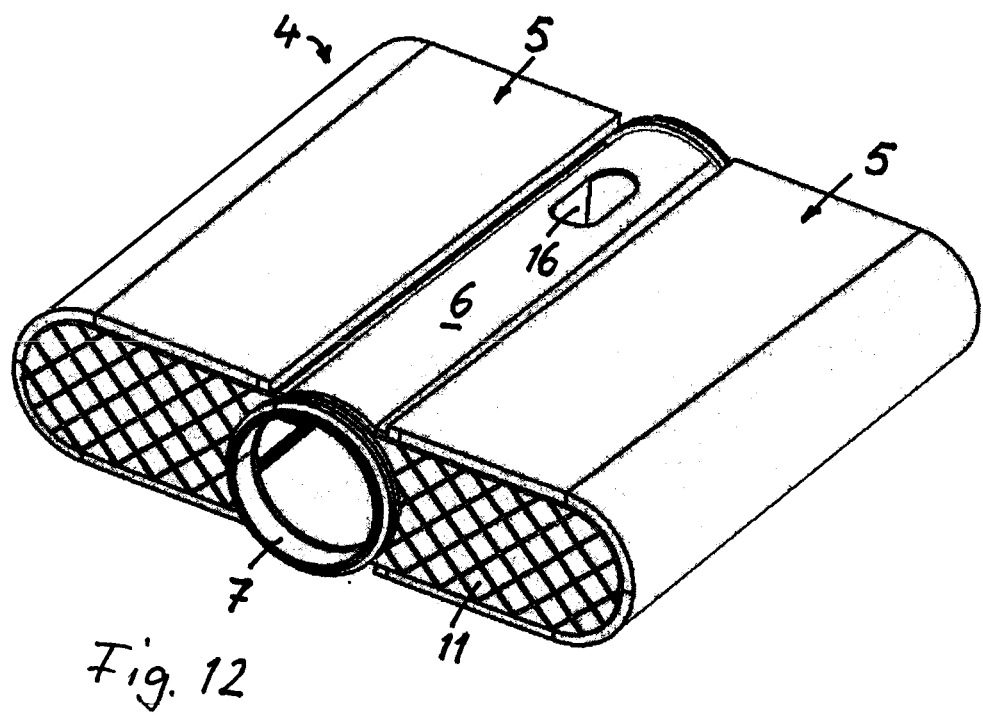
FIG. 12 shows the filter cartridge according to FIG. 11 in the completely installed state.

Another exemplary embodiment of a filter cartridge 4 is shown in FIGS. 11 and 12. The filter cartridge 4 includes a central outflow pipe 6 to which a supporting frame 9 is connected, a supporting frame 9 being provided for a respective filter element 5 on diagonally opposing sides of the outflow pipe 6. A hollow base 16 is introduced for assembly-related purposes into the outflow pipe 6 in the aforedescribed manner which passes through the outflow pipe 6 orthogonally to its longitudinal axis. Each filter element 5 optionally consists of an outer filtering or covering layer 21 and, in all cases, of an inner-lying filtering means 22, which rests directly on the U-shaped supporting frame 9, so that the filter element 5 with the two layers 21, 22 also has an overall U-shaped cross section. Flow openings 23 are disposed in the wall of the outflow pipe 6 through which the clean space between the legs of the U-shape of the filter element 5 is connected to the interior of the outflow pipe 6.

At the axial ends, the filter elements 5 are covered by end plates 10 and 11, respectively.

Figure 13:
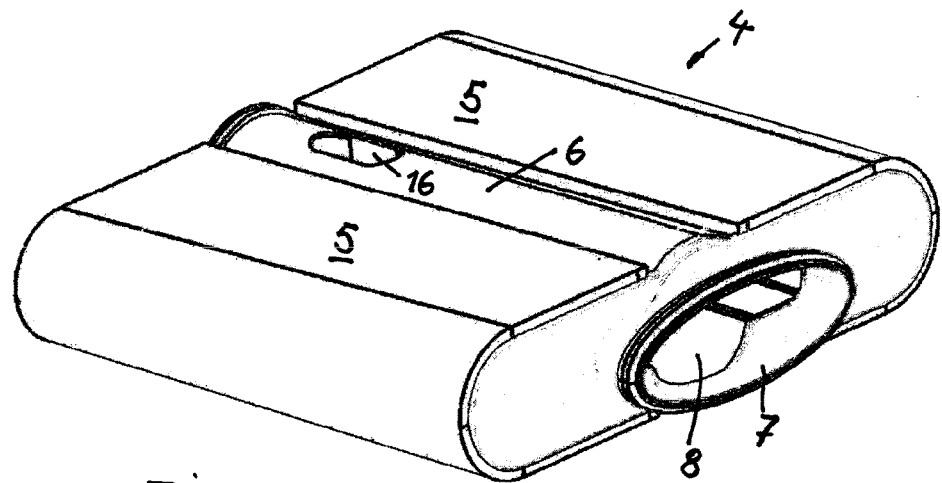
FIG. 13 shows a design variant of a filter cartridge with an oval-shaped outflow opening.

In the exemplary embodiment according to FIG. 13, the filter cartridge 4 also has two filter elements 5 arranged on diagonally opposing sides of the outflow pipe 6 and U-shaped in cross section. The housing nozzle 7 has an oval-shaped cross section; the outflow pipe 6 and the front-side outflow opening 8 are also expediently provided with an oval-shaped cross section. In the preceding exemplary embodiments, on the other hand, the outflow pipe, outflow opening and housing nozzle each have a round cross section.

Figure 14:
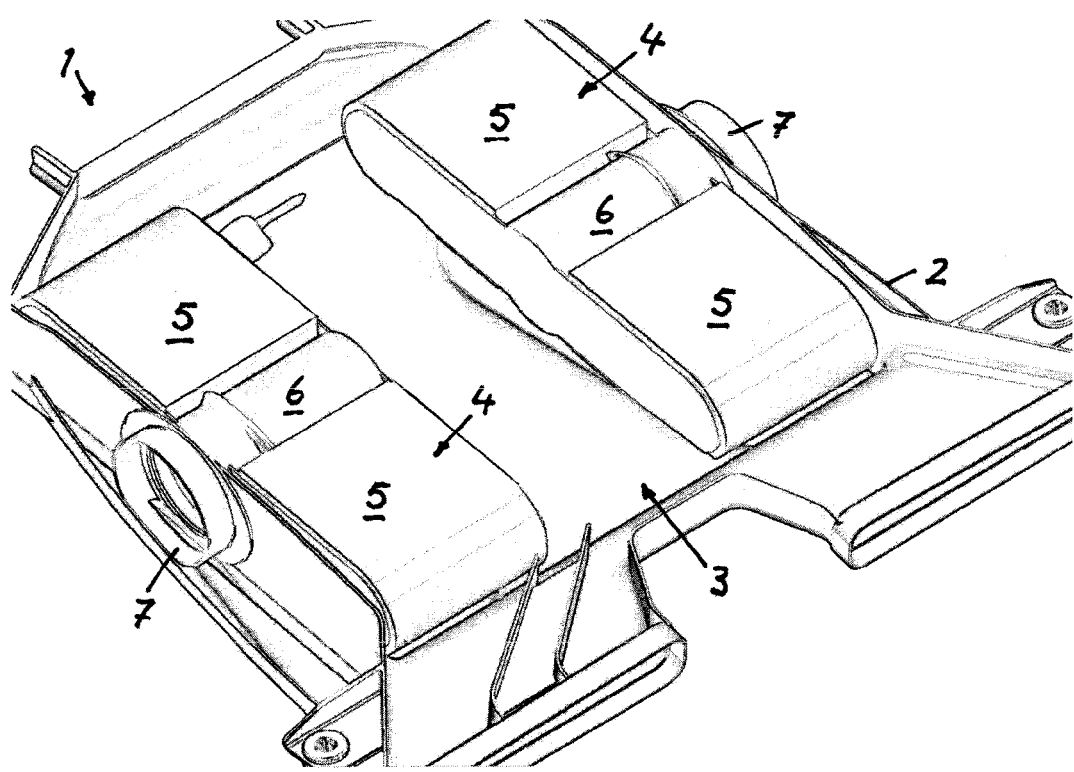
FIG. 14 shows a design variant of a filter apparatus with two separate filter cartridges in a receiving space of the filter housing.
Figure 15:
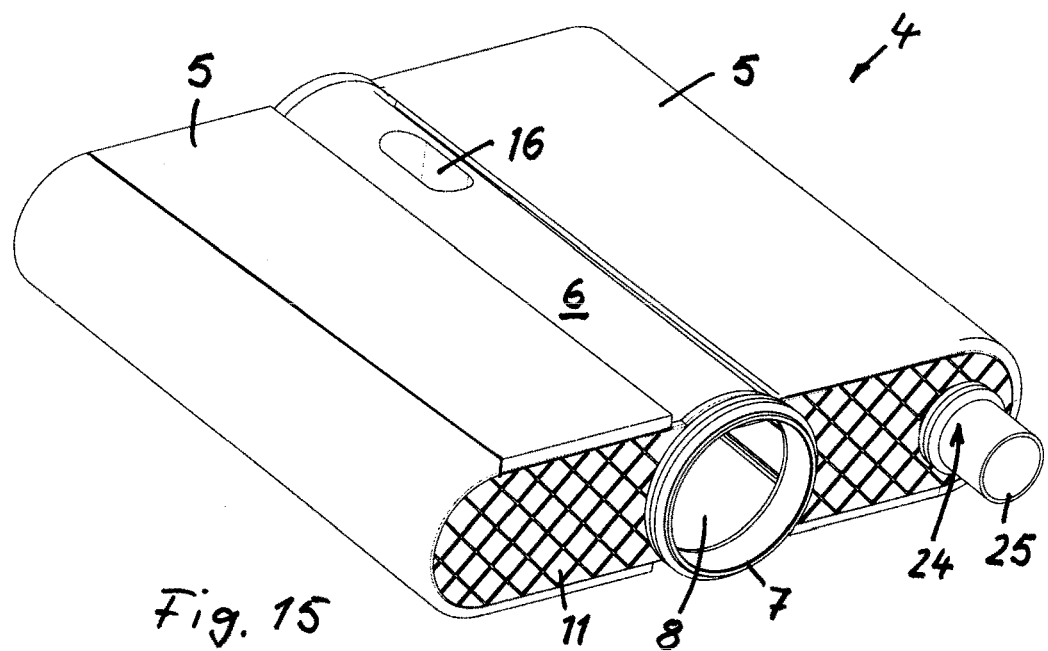
FIG. 15 shows a design variant of a filter cartridge with additional secondary outflow opening arranged on the filtered side of the filter element with a parallel offset to the central outflow opening.
Figure 16:
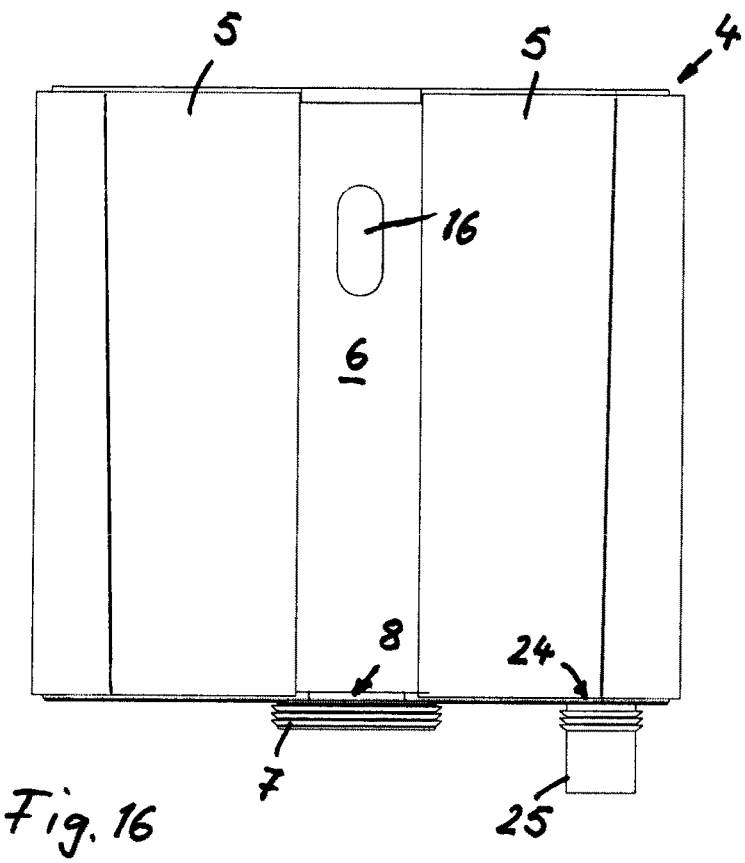
FIG. 16 shows a top view of the filter cartridge from FIG. 15.
Figure 17:
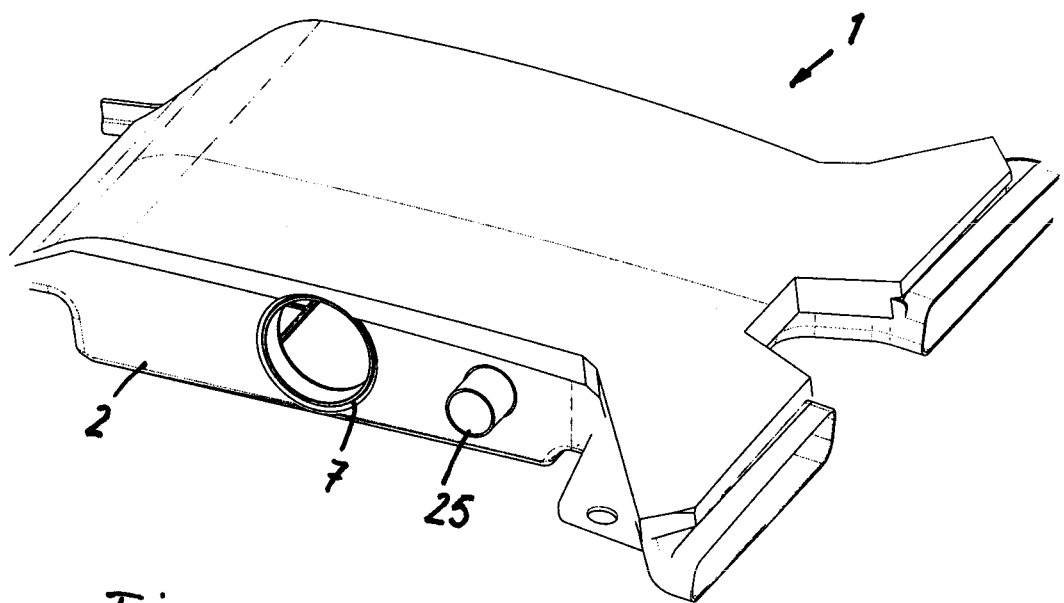
FIG. 17 shows a perspective view of a filter apparatus with a filter cartridge according to FIGS. 15 and 16.
Figure 18:
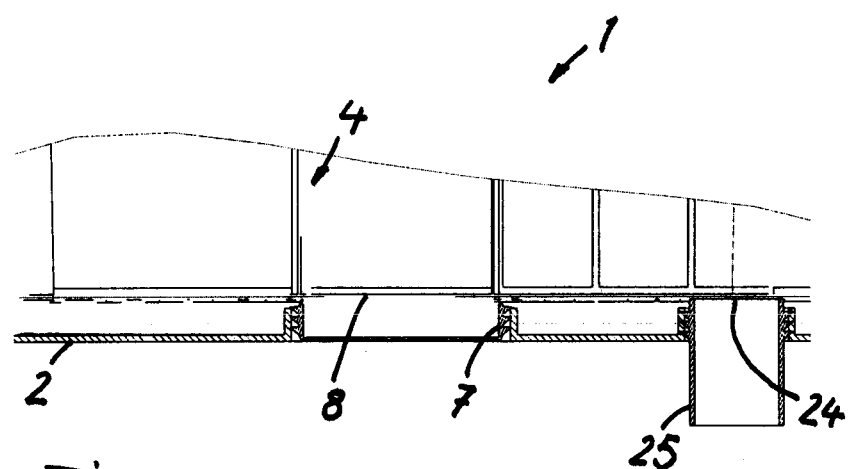
FIG. 18 shows a sectional view of the filter apparatus from FIG. 17.

FIG. 14 shows another design variant of a filter device 1 in which two separate filter cartridges 4 are received in the receiving space 3 of the filter housing 2. The filter cartridges 4 are of equal construction and, like in the first exemplary embodiment, each consists of two cross-sectionally U-shaped filter elements 5 on diagonally opposing sides of an outflow pipe 6 that is connected to a housing-side nozzle 7.

FIGS. 15 to 18 show another exemplary embodiment of a filter cartridge 4 and filter apparatus 1 with a filter cartridge. The filter cartridge 4 depicted in FIGS. 15 and 16 has basically the same construction as the filter cartridge shown in FIGS. 11 and 12 and includes a centrally arranged outflow pipe 6 as well as two diagonally opposing filter elements 5 provided with a U-shaped cross section whose open U-side borders the outflow pipe 6. The filter elements 5 are flowed through in the transverse direction with respect to the longitudinal axis of the outflow pipe 6, the filtered side of the filter elements 5 being connected via flow openings in the wall of the outflow pipe 6 to the interior of the outflow pipe, whereby the filtered fluid is discharged axially via the outflow pipe 6 and the front-side outflow opening 8, which is immediately adjacent to the housing nozzle 7.

In addition to the outflow opening 8, a second outlet referred to as a secondary outflow opening 24 is provided on the filtered side of the filter cartridge 4. The secondary outflow opening 24 is located on the same front side of the filter cartridge as the primary outflow opening 8, but with a parallel offset. The secondary outflow opening 24 is introduced into the end plate 11 and, in relation to the central outflow opening 8, is laterally offset and adjacent to the U-shape of one of the two filter elements 5. A secondary outflow opening 24 is provided only in the region of the filter element 5, whereas the second filter element 5 has no such secondary outflow opening. However, it can be expedient to provide on both filter elements 5 a respective secondary outflow opening that is offset with respect to the central outflow opening 8. Furthermore, it is possible to arrange the secondary outflow opening 24 on the front side of the filter element opposite the primary outflow opening 8.

A secondary nozzle 25 is associated with the secondary outflow opening 24 and, when mounted in the filter housing 2 (FIGS. 17, 18), projects through a recess in the side wall of the filter housing 2. The secondary nozzle 25, like the housing nozzle 7 associated with the primary outflow opening 8, is provided with a groove portion on the outer lateral surface with which the nozzles 7, 25 are seated in a frictional or force-fitted manner in the recesses in the side wall of the filter housing 2.

Figure 19:
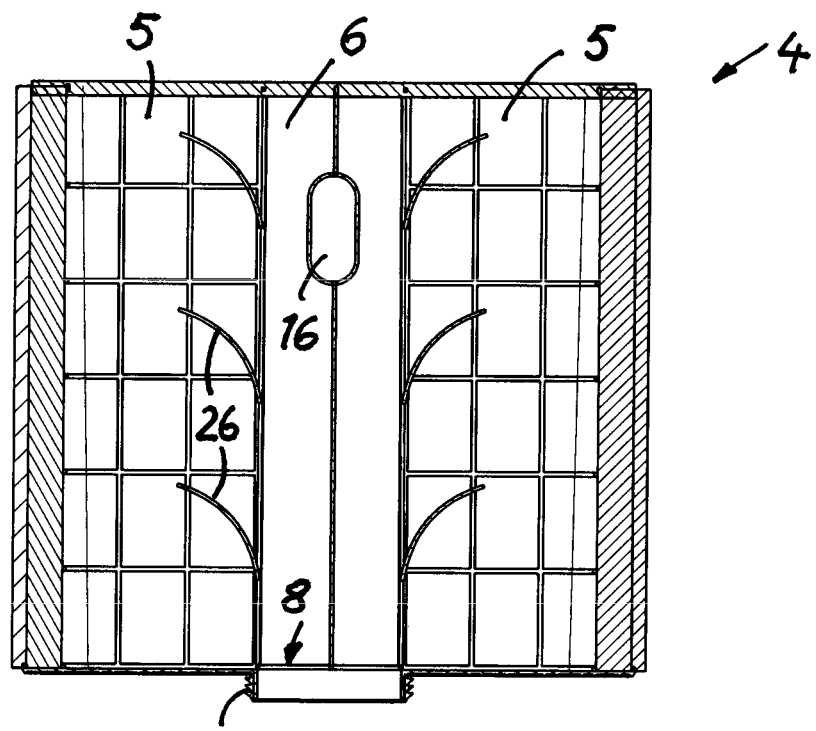
FIG. 19 shows a top view of another embodiment of a filter cartridge.

FIG. 19 shows another exemplary embodiment of a filter cartridge 4 that has basically the same construction as in the exemplary embodiment according to FIGS. 11, 12. U-shaped filter elements, whose open U-side is immediately adjacent to the outflow pipe 6, are respectively located on diametrically opposed sides of an outflow pipe 6. Cleaned gas on the interior of the filter elements 5 is conveyed via flow openings into the outflow pipe 6 and discharged from same axially via a front-side outflow opening 8.

Flow-conducting elements 26, embodied so as to be curved, are located on the outer wall of the outflow pipe 6 and extend inward from the outer wall of the outflow pipe 6 in the direction of the respective filter elements 5. The flow-conducting elements [2]6 are intended to support the discharging of the cleaned gas from the interior of the filter elements 5 via the flow openings in the wall into the outflow pipe 6. Several flow-conducting elements 26 are distributed over the axial length of the outflow pipe 6 and extend into each of the two diametrically opposed filter elements 5.

What is claimed is:

1. A filter cartridge for a filter apparatus, comprising:
   a filter element that encloses an clean space within the filter element, at least partially;

wherein the filter element has an outflow opening in flow communication with the clean space in the filter element;
wherein the filter element has a longitudinal axis extending through the filter element and through the outflow opening;
wherein a hollow base for connecting to a housing-side fastening element is arranged on or in the clean space;
wherein an interior of the hollow base is sealed off from the clean space in a flow-tight manner;
wherein the hollow base extends orthogonally to major planes of extension of an upper and a lower filter layer if the filter element; and
wherein the clean space is arranged between the upper and lower filter layers, laterally separating major portions of the upper and lower filter layers from one another.

2. The filter cartridge as set forth in claim 1, wherein the outflow opening is arranged on the filter element on an outflow pipe.

3. The filter cartridge as set forth in claim 2, wherein the filter element engages around the outflow pipe at least partially;
wherein the outflow pipe has at least one flow opening arranged in a circumferential wall of the outflow pipe in a portion around which the filter element engages.

4. The filter cartridge as set forth in claim 2, wherein the hollow base is introduced into the outflow pipe.

5. The filter cartridge as set forth in claim 1, wherein the filter element is embodied as a folded filter.

6. The filter cartridge as set forth in claim 1, wherein the hollow base has an elongate cross section in a plane parallel with the longitudinal axis extending through the filter element.

7. The filter cartridge as set forth in claim 1, wherein an interior of the hollow base is continuous.

8. The filter cartridge as set forth in claim 1, wherein the filter element has an at least approximately U-shaped cross section;
wherein legs of the U-shaped cross section enclose a filtered side of the filter element;
wherein the outflow opening lies transverse to a longitudinal extension of the legs.

9. A filter apparatus, comprising:
a filter cartridge according to claim 1.

10. The filter apparatus as set forth in claim 9, wherein at least one fastening element is arranged on the filter housing or on the housing cover and projects into an interior of the hollow base.

11. The filter apparatus as set forth in claim 10, wherein the at least one fastening element on the filter housing or on the housing cover has a smaller cross section than the hollow base.

12. The filter apparatus as set forth in claim 10, wherein two fastening elements of the at least one fastening element on the filter housing or on the housing cover project into the interior of the hollow base and are interconnected.

13. A filter cartridge for a filter apparatus, comprising:
a filter element that encloses an clean space within the filter element, at least partially;
wherein the filter element has an outflow opening in flow communication with the clean space in the filter element;
wherein the filter element has a longitudinal axis extending through the filter element and through the outflow opening;
wherein a hollow base for connecting to a housing-side fastening element is arranged on or in the clean space;
wherein an interior of the hollow base is sealed off from the clean space in a flow-tight manner;
wherein the outflow opening is arranged on the filter element on an outflow pipe;
wherein the filter element engages around the outflow pipe at least partially; and
wherein the outflow pipe has at least one flow opening arranged in a circumferential wall of the outflow pipe in a portion around which the filter element engages.

14. The filter cartridge as set forth in claim 13, wherein the hollow base extends orthogonally to an upper and a lower filter layers of the filter element;
wherein the clean space is arranged between the upper and a lower filter layers.

15. A filter cartridge for a filter apparatus, comprising:
a filter element that encloses an clean space within the filter element, at least partially;
wherein the filter element has an outflow opening in flow communication with the clean space in the filter element;
wherein the filter element has a longitudinal axis extending through the filter element and through the outflow opening;
wherein a hollow base for connecting to a housing-side fastening element is arranged on or in the clean space;
wherein an interior of the hollow base is sealed off from the clean space in a flow-tight manner;
wherein a fastening element is arranged on a filter housing and on a housing cover; and
wherein the fastening elements of the filter housing and the housing cover project into the interior of the hollow base and are interconnected by a single threaded fastener that joins the housing cover to the filter housing and also sets the position of the filter element to the filter housing.

16. The filter apparatus as set forth in claim 15 wherein the hollow base has an elongated cross section in a plane parallel with the longitudinal axis extending through the filter element and the filter element can be adjusted along the longitudinal axis with respect to the housing.

17. A filter cartridge as set forth in claim 15, wherein the hollow base extends transverse to the longitudinal axis of the outflow opening through which the fluid can be discharged from the clean space.

18. The filter cartridge as set forth in claim 17, wherein the longitudinal axis through the outflow opening lies transverse to a direction of flow of the filter element.

19. A filter cartridge for a filter apparatus, comprising:
a filter element that encloses an clean space within the filter element, at least partially;
wherein the filter element has an outflow opening in flow communication with the clean space in the filter element;
wherein the filter element has a longitudinal axis extending through the filter element and through the outflow opening;
wherein a hollow base for connecting to a housing-side fastening element is arranged on or in the clean space;
wherein an interior of the hollow base is sealed off from the clean space in a flow-tight manner;
wherein the hollow base extends orthogonally to an upper and a lower filter layers of the filter element and wherein the hollow base has an elongate cross section in a plane parallel with the longitudinal axis extending through the filter element; and wherein the clean space is arranged between the upper and lower filter layers, laterally separating major portions of the upper and lower filter layers from one another.

* * * * *